United States Patent [19]

Andrus et al.

[11] Patent Number: 5,256,603
[45] Date of Patent: Oct. 26, 1993

[54] GLASS BONDED CERAMIC COMPOSITES

[75] Inventors: Ronald L. Andrus, Corning; John F. MacDowell, Penn Yan; Linda R. Pinckney, Corning, all of N.Y.

[73] Assignee: Corning Incorporated, Corning, N.Y.

[21] Appl. No.: 979,050

[22] Filed: Nov. 19, 1992

[51] Int. Cl.⁵ .............................................. C03C 14/33
[52] U.S. Cl. ...................... 501/32; 501/77; 501/127; 51/308; 51/309
[58] Field of Search ............... 501/32, 77, 88, 96, 501/97, 102, 103, 106, 119, 127; 51/308, 309

[56] References Cited

U.S. PATENT DOCUMENTS

| | | | |
|---|---|---|---|
| 1,968,854 | 8/1934 | Pirani et al. | 313/636 |
| 2,495,606 | 1/1950 | Schaefer | 51/308 |
| 2,511,679 | 6/1950 | Thiess | 501/77 |
| 3,598,620 | 8/1971 | Akhtar | 501/77 |
| 3,704,146 | 11/1972 | Dulat | 501/144 |
| 4,689,271 | 8/1987 | Schittenhelm et al. | 428/446 |
| 4,695,504 | 9/1987 | Watanabe | 428/209 |
| 5,112,777 | 5/1992 | MacDowell | 501/32 |

OTHER PUBLICATIONS

A. Valenti et al. in "Glass–Ceramic Bonding in Aluminum/CBN Abrasive Systems", *Journal of Materials Science*, 27, pp. 4145–4150 (1992).

*Primary Examiner*—Karl Group
*Assistant Examiner*—Deborah Jones
*Attorney, Agent, or Firm*—Clinton S. Janes, Jr.

[57] ABSTRACT

This invention is directed to the formation of glass bonded ceramic composite articles, with particular emphasis on forming abrasive products such as grinding wheels. The glasses consist essentially, in weight percent of 15–35% CaO, 35–55% $B_2O_3$, and 10–35% $SiO_2$, with alumina comprising the preferred abrasive particles being bonded into an abrasive product.

7 Claims, No Drawings

GLASS BONDED CERAMIC COMPOSITES

BACKGROUND OF THE INVENTION

U.S. Pat. No. 5,112,777 (MacDowell), assigned to the same assignee of the present application, discloses the use of glass-ceramic materials as binders for particulate ceramics, most specifically, alumina ceramics. Numerous uses for such composites were proposed in that patent. For example:

It was postulated that the oxidation of fibers entrained within ceramic bodies might be reduced through the presence of the residual glassy phase following the crystallization of the glass-ceramic bonding phase. It was also theorized that glass-ceramic bonded refractory phases, notably $Al_2O_3$, cordierite, $Si_3N_4$, SiC, TiN, and $ZrO_2$, ought to allow lower sintering and hot pressing temperatures with increased mechanical strength and toughness, while continuing to maintain high use temperatures. Yet another proposal involved the inclusion of highly refractory particulate ceramics, such as $Al_2O_3$ and/or $ZrO_2$, as fillers in glass-ceramic coatings on the premise that those coatings would provide excellent barriers on various substrates to attack by oxygen and hydrogen. Finally, and the patent was principally directed to this utility, the useful life of abrasive products, with express reference to grinding wheels wherein particulate $Al_2O_3$ constitutes the abrasive grain, could be extended through the use of a glass-ceramic, rather than a glass, bond.

The glass-ceramic materials disclosed in that patent contained a divalent metal borate crystal phase and were produced from precursor glasses consisting essentially, expressed in terms of weight percent on the oxide basis, of 25-65% $B_2O_3$ and 20-75% RO, wherein RO consists of at least one divalent metal oxide selected from the group consisting of CaO, SrO, BaO, MnO, and ZnO, the sum of $B_2O_3$+RO constituting at least 55% of the total composition, with the following optional components in the indicated proportions of up to 20% $SiO_2$, up to 15% F, up to 25% MgO, up to 10% $ZrO_2$, and up to 40%. It was observed that, when $Al_2O_3$ was present at levels greater than 20%, at least 2% F and/or 10% $SiO_2$ would be included.

SUMMARY OF THE INVENTION

While investigating that broad family of glass-ceramic compositions as binders in bonded ceramic composites, a relatively narrow range of compositions was discovered which produces bonds that, while wholly or primarily amorphous, impart unusually high bond strengths to the composites, as measured by standard compressive and flexural strength techniques. The inventive glasses are encompassed within the CaO—$B_2O_3$—$SiO_2$ system and can generally be described as sub-siliceous borosilicates, i.e., glasses having high $B_2O_3$ contents with low $SiO_2$ contents, in which CaO replaces the alkali metal oxides commonly found in glass bonding agents. As expressed in terms of weight percent on the oxide basis, the inventive glasses consist essentially of 15-35% CaO, 35-55% $B_2O_3$, and 10-35% $SiO_2$, the sum of CaO+$B_2O_3$+$SiO_2$ constituting at least 80% of the total composition and the molar ratio CaO:$B_2O_3$ being less than 1. The following optional components may be added in the indicated proportions in weight percent:

| MgO | 0-15 | $Na_2O$ | 0-20 | $ZrO_2$ | 0-10 |
|---|---|---|---|---|---|
| SrO | 0-20 | $K_2O$ | 0-20 | $MoO_3$ | 0-10 |
| BaO | 0-20 | $Al_2O_3$ | 0-20 | $WO_3$ | 0-10 |
| $Li_2O$ | 0-15 | F | 0-8 | $Nb_2O_5$ | 0-20. |
| $P_2O_5$ | 0-20 | | | | |

The preferred composition ranges for obtaining the strongest bonds consist essentially of 15-30% CaO, 42-52% $B_2O_3$, and 10-30% $SiO_2$ with a molar ratio CaO:$B_2O_3$ between 0.5-0.9.

Frits of the inventive glasses demonstrate excellent fluxing characteristics against α—$Al_2O_3$ ceramic particles; they wet the particles well and furnish a very strong bond. A study of scanning electron micrographs has indicated that the fracture path is largely transgranular, thus denoting a tougher bond than one which is simply intergranular. The frits are amenable to a wide range of firing schedules, including temperatures lower than 900° C. That feature contrasts with the customary firing schedules for ceramic composites of 1000°-1500° C.

Potential applications for these glass bonded ceramic composites include fully dense, glass bonded alumina and other ceramic materials such as cordierite, SiC, $Si_3N_4$, $TiB_2$, TiN, zircon, and $ZrO_2$, especially for use as high performance coatings and as substrates for microelectronic circuitry. In addition, the inventive glasses were deemed to be suitable as a bond for abrasive products, in like manner to the glass-ceramic bonding materials of U.S. Pat. No. 5,112,777, supra.

Strict observance of the specified composition intervals has been found to be critical in securing glasses demonstrating the desired properties. To illustrate:

Compositions wherein the CaO content is below 15% exhibit poor flow in the frit sintering step such that the glass does not properly wet the ceramic grains to assure strong bonding. Molar ratios CaO:$B_2O_3$ close to and greater than 1 promote excessive crystallization of either a calcium borate phase or a calcium aluminoborate phase if $Al_2O_3$ is present. Such development of crystallization physically impedes flow of the glass.

Compositions wherein the $B_2O_3$ concentration is below 35% are more refractory glasses, therefore requiring higher firing temperatures. Also, low $B_2O_3$ contents hazard devitrification of a calcium silicate and/or a calcium borate phase. Furthermore, as observed above, molar ratios CaO:$B_2O_3$ in the close vicinity of and greater than 1 result in devitrification. Where the concentration of $B_2O_3$ exceeds 55%, the chemical durability of the glasses suffers and devitrification may occur; e.g., crystals of the $9Al_2O_3$—$2B_2O_3$ phase may develop when $Al_2O_3$ is present in the composition.

The presence of $SiO_2$ is necessary to inhibit crystallization and to assure good glass flow and wetting. The chemical durability of the glass is also enhanced through the inclusion of $SiO_2$. Nevertheless, where the $SiO_2$ content exceeds 35%, the glass becomes more refractory, it flows less, and may be prone to phase separation or even devitrification of a calcium silicate phase. Conversely, where the $SiO_2$ level is below 10%, crystallization of a calcium borate or calcium aluminoborate generally occurs.

The development of devitrification can also be influenced by the heat treatment employed in the sintering process. For example, a prolonged heating at 800° C. can induce significant crystallization (primarily of a calcium borate phase) in some of the compositions. Accordingly, for primarily an amorphous bond, sintering temperatures of at least 850° C. are preferred, with temperatures in the vicinity of 900° C. being the most preferred. In general, 1000° C. constitutes a practical maximum sintering temperature to control glass flow and to secure the desired porosity in the final product.

The strength of the bonding developed by the inventive glasses renders them exceptionally suitable for use in bonded abrasive products. The composite bodies used in that application may contain up to 70% by volume porosity and frequently incorporate a specific amount of porosity (typically 5-50% by volume) to permit coolant flow during grinding. Strong bonding is of prime importance for such products inasmuch as they can provide longer product life, as well as permitting higher levels of porosity. Higher levels of porosity permit increased flow of coolant, a necessity in high performance grinding operations. Desirably, the final product will contain about 5-25% by volume glass bond, 40-70% by volume abrasive particles, and 25-50% by volume open porosity.

Prior Art

U.S. Pat. No. 1,968,854 (Pirani et al.) is directed to the fabrication of glass envelopes for a gaseous electric discharge device, the glass consisting essentially, in weight percent, of

| CaO | 10-11 | $Na_2O$ | 4-5 |
|---|---|---|---|
| $B_2O_3$ | 40-60 | $Al_2O_3$ | 11-13. |
| $SiO_2$ | 20-30 | | |

The CaO content is less than the minimum required in the glasses used in the present invention.

U.S. Pat. No. 2,495,606 (Schaefer) reports glasses designed for use in glass bonded diamond abrasive articles such as grinding wheels. Frits of the glasses can be sintered at temperatures between 500°-750° C. and consist essentially, in weight percent, of 15-55% PbO, 10-40% $B_2O_3$, and 20-55% $SiO_2$. This disclosure is representative of low melting glasses that have been devised to bond abrasive grains, the type of glass the glasses employed in instant inventive products were designed to constitute an improvement upon.

U.S. Pat. No. 2,511,679 (Thiess) is drawn to sealing glasses especially developed for fabricating completely vitreous, non-porous, vacuum tight, ceramically-compounded bodies, with emphasis on bodies comprising principally zirconium silicate, magnesium silicate, and alumina. The sealing glasses consisted essentially, in weight percent, of 20-30% CaO, 38-50% $B_2O_3$, 10-27% $SiO_2$, 2-6% MgO, and 8-9% $Al_2O_3$. Whereas there is partial overlap between those ranges and the composition intervals of the glasses involved in the subject invention, the instant invention is directed to a product different from those described in the patent. Thus, the present application discloses and claims two-phase composite bodies, monoliths and coatings, consisting of ceramic particles bonded together by glass; that is, bodies containing a glass phase and a particulate ceramic phase which are prepared by firing at temperatures no higher than about 1000° C. In contrast, the patent discloses articles fired at 1350°-1400° C. to become completely vitrified, vacuum tight bodies.

U.S. Pat. No. 3,598,620 (Akhtar) records glasses designed for sealing to molybdenum metal and molybdenum alloys consisting essentially, in weight percent, of

| CaO | 11-15 | $Al_2O_3$ | 18 |
|---|---|---|---|
| $B_2O_3$ | 39-47 | MgO | 1. |
| $SiO_2$ | 20-30 | | |

The concentration of CaO is generally necessary in the subject inventive glasses.

U.S. Pat. No. 3,704,146 (Dulat) is concerned with fluxes to be used in firing whiteware bodies, the fluxes consisting essentially, in weight percent, of 5-30% CaO and/or MgO, 30-60% $B_2O_3$, 20-60% $SiO_2$, and 0-15% $Na_2O$. When CaO was used, firing temperatures of at least 1000° C. and usually 1100° C. were necessary. Although there is partial overlap between those composition intervals and the regions of glasses used in the present invention, the subject invention is drawn to products different from those described in the patent. To illustrate, the present application discloses and claims composite abrasive articles, in particular grinding wheels, comprising about 40-60% relatively large grain (~0.2 mm) of abrasive material, in particular alumina, bonded with about 7.5-15% glasses having compositions within strictly restricted regimes, whereas the patent discloses articles comprising about 95% very finely divided grains (<0.075 mm) of clay and flint with about 5% flux fired at temperatures above 1000° C., most preferably at 1150° C., to produce vitrified whiteware bodies.

U.S. Pat. No. 4,689,271 (Schittenhelm et al.) describes coating a metal sheet with an insulating glass coating, the coating consisting essentially, in weight percent, of

| CaO | 29-33 | $Al_2O_3$ | 7-10 |
|---|---|---|---|
| $B_2O_3$ | 43-47 | MgO | 1-2 |
| $SiO_2$ | 10-15 | | |

Whereas the above composition regimes fall within the ranges of the instant inventive glasses, the patent is directed to products outside of those prepared in the present invention. Thus, the present invention discloses and claims two-phase composite bodies, monoliths and coatings, comprising ceramic particles bonded together by glass; that is, bodies containing a particulate ceramic phase entrained in a glass phase. In contrast, the patent is drawn solely to vitreous coatings.

U.S. Pat. No. 4,695,504 (Watanabe et al.) reports thick film resistor compositions, one component of which is an alkaline earth borosilicate glass consisting essentially, in weight percent, of

| CaO and/or SrO and/or BaO | 30-50 | $Al_2O_3$ | 0-15 |
|---|---|---|---|
| $B_2O_3$ | 30-50 | MgO | 0-5. |
| $SiO_2$ | 2-10 | | |

The $SiO_2$ is generally below the minimum demanded in the glasses used in the present inventive products.

A. Valenti et al. in "Glass-Ceramic Bonding in Aluminum/CBN Abrasive Systems", *Journal of Materials Science*, 27, pages 4145-4150 (1992) discuss the use of glass frits having compositions in the $Na_2O$—$K_2O$—$Al_2O_3$—$B_2O_3$—$SiO_2$ system as bonds for $Al_2O_3$ and/or cubic boron nitride particles to produce abrasive articles. Upon sintering the frit to seal the particles, the glass is converted into a glass-ceramic. Alkaline earth metal oxides are nowhere mentioned.

DESCRIPTION OF PREFERRED EMBODIMENTS

Table I records several glass forming compositions, expressed in terms of parts by weight on the oxide basis, illustrating the inventive glasses. Because it is not known with which cation(s) the fluoride is combined in the glass, it is simply reported as fluoride as being in excess of the oxide components. However, inasmuch as the sum of all the components, including the fluoride, totals or closely approximates 100, for all practical purposes the tabulated individual values may be considered to represent weight percent. The actual batch ingredients may comprise any materials, either oxides or other compounds, which, when melted together with one another, will be transformed into the desired oxide in the proper proportions. For example, $Li_2CO_3$ can conveniently constitute the source of $Li_2O$ and $CaF_2$ can be used to supply the fluoride content. Colemanite can be used as a batch material to provide CaO and $B_2O_3$.

The batch materials were compounded, ballmilled together to assist in achieving a homogeneous melt, and charged into platinum crucibles. After placing lids thereon, the crucibles were placed into a furnace operating at a temperature of about 1500° C. and maintained therewithin for about two hours.

To reduce the time and energy necessary to comminute the glass to finely-divided particles, the melts were poured as fine streams into a bath of tap water. This procedure, termed "drigaging" in the glass art, breaks up the stream of molten glass into small fragments which can thereafter be milled to a desired particle size. Another technique for accomplishing the same purpose involves running a stream of molten glass between metal rollers to form a thin ribbon of glass which can then be crushed and milled to a desired particle size. Both methods were employed in the laboratory work. In each instance the glasses were milled to an average particle size of 10 microns.

It will be recognized that the above description of mixing, melting, and forming procedures reflects laboratory activity only and that the glass compositions operable in the subject invention are capable of being processed employing mixing, melting, and forming procedures conventionally utilized in commercial glassmaking. That is, it is only necessary that the batch components be thoroughly blended together, melted at a sufficiently high temperature for a sufficient length of time to secure a homogeneous melt, and subsequently shaped into a glass article.

To determine the sintering and crystallization characteristics of the glass powders, 0.5" (~1.3 cm) diameter cylindrical pellets weighing 2.5 grams were dry pressed at 10,000 psi (~703 kg/cm²) and fired at various temperatures. Visual examination of flow properties and densification provided screening of glass compositions.

TABLE I

|      | 1    | 2    | 3    | 4    | 5    | 6    |
|------|------|------|------|------|------|------|
| CaO  | 33.9 | 22.0 | 25.4 | 23.8 | 22.3 | 23.6 |
| $B_2O_3$ | 42.0 | 54.5 | 47.3 | 44.3 | 41.5 | 51.2 |
| $SiO_2$ | 24.1 | 23.5 | 27.2 | 25.5 | 23.9 | 25.2 |
| $Li_2O$ | —    | —    | —    | 6.4  | —    | —    |
| $Na_2O$ | —    | —    | —    | —    | 12.3 | —    |

TABLE I-continued

|      | 7    | 8    | 9    | 10   | 11   | 12   |
|------|------|------|------|------|------|------|
| CaO  | 23.8 | 28.1 | 27.3 | 21.0 | 20.7 | 24.2 |
| $B_2O_3$ | 44.3 | 41.8 | 50.8 | 39.0 | 38.5 | 45.0 |
| $SiO_2$ | 31.8 | 30.1 | 21.9 | 22.4 | 22.1 | 25.9 |
| $K_2O$ | —    | —    | —    | 17.6 | —    | —    |
| $Al_2O_3$ | —    | —    | —    | —    | 18.8 | —    |
| $WO_3$ | —    | —    | —    | —    | —    | 5.0  |

|      | 13   | 14   | 15   | 16   | 17   | 18   |
|------|------|------|------|------|------|------|
| CaO  | 25.4 | 24.8 | 23.3 | 17.2 | 21.3 | 19.7 |
| $B_2O_3$ | 47.3 | 46.1 | 43.4 | 42.6 | 46.2 | 48.8 |
| $SiO_2$ | 27.2 | 13.2 | 24.9 | 24.5 | 22.8 | 28.0 |
| F    | 5.0  | —    | —    | —    | —    | —    |
| MgO  | —    | 4.5  | 8.4  | —    | —    | —    |
| SrO  | —    | 11.4 | —    | —    | —    | —    |
| BaO  | —    | —    | —    | 15.7 | —    | —    |
| $Al_2O_3$ | —    | —    | —    | —    | 9.7  | —    |
| $Li_2O$ | —    | —    | —    | —    | —    | 3.5  |

|      | 19   | 20   | 21   | 22   | 23   |
|------|------|------|------|------|------|
| CaO  | 26.5 | 30.9 | 22.6 | 16.9 | 22.8 |
| $B_2O_3$ | 52.6 | 51.1 | 48.1 | 50.4 | 42.4 |
| $SiO_2$ | 11.3 | 11.0 | 27.6 | 29.0 | 24.4 |
| F    | 5.0  | —    | —    | —    | 5.0  |
| MgO  | —    | 3.7  | —    | —    | —    |
| $Al_2O_3$ | 9.6  | —    | —    | —    | 10.4 |
| $Li_2O$ | —    | —    | 1.7  | 3.6  | —    |
| $P_2O_5$ | —    | 3.3  | —    | —    | —    |

Promising compositions were then tested in several ceramic composite constructions, those constructions ranging from fully dense composites to those incorporating up to 40% porosity, in order to evaluate their suitability for applications ranging from hard coatings to bonded abrasive products.

To carry out those tests, a suite of fully dense or nearly fully dense composites was first prepared comprising mixtures of glass frit and ceramic powders. Three representative glass compositions and four ceramic powders were employed. The powdered ceramic materials included very fine-grained $Al_2O_3$ [−400 U.S. Standard Sieve (37 μm)], a medium-grained $Al_2O_3$ [+200 U.S. Standard Sieve (74 μm)], −325 U.S. Standard Sieve (44 μm) $ZrO_2$, and −325 U.S. Standard Sieve (44 μm) $ZrSiO_4$.

Mixtures of glass frits and ceramic powders were prepared in 3:1 and 1:1 proportions by weight. Small quantities were dry mixed in a mixer-mill shaker for 10 minutes to assure thorough blending. Pellets were pressed at 10,000 psi (~703 Kg/cm²) and then fired on platinum sheets utilizing one of the following two schedules:

(a) heat from room temperature to 800° C. at a rate of 100° C./hour and hold at 800° C. for 8 hours; or (b) heat from room temperature to 900° C. at a rate of 100° C./hour and hold at 900° C. for 8 hours.

After visual appraisal of the fired pellets (observing flow, color, and surface finish), they were broken open with a sharpened cold chisel and the relative toughness of each was assessed. Grain size and relative porosity, as determined qualitatively by means of the following ink penetration technique, were then noted. The results of those observations and tests are recorded in Table II.

The ink penetration technique comprises the following steps:

(1) The exterior and interior broken surfaces are marked with a common felt tipped, fine point pen using water soluble ink;

(2) The ink is allowed to soak in and dry on those surfaces for about 10 seconds;

(3) The inked area is wiped with a slightly water dampened paper tissue to remove any dried ink from the surface; and (4) The inked area is examined visually for porosity utilizing a hand lens.

In Table II, the term "porous" indicates that the ink flowed freely and heavily into the surface. The expression "slightly porous" indicates that some ink penetration could be observed which remained after wiping the surface with the moist tissue.

Several samples were subjected to X-ray diffraction analysis in order to determine the phase assemblage present therein and to gauge the extent of reaction between the glass and the ceramic components. Test samples were prepared from the three toughest-appearing composites for measurement of modulus of rupture (MOR), expressed in terms of psi, fracture toughness ($K_{IC}$), expressed in terms of MPa/m, and linear coefficient of thermal expansion (Exp) over the temperature range of 25°–300° C., expressed in terms of $\times 10^{-7}$/° C.

The values resulting from those tests are reported in Table III.

TABLE II

| COMP. | EX. | HEAT TREAT. | CERAMIC | CERAMIC: GLASS | DESCRIPTION |
|---|---|---|---|---|---|
| 3 | 1 | a | −400 Al$_2$O$_3$ | 1:3 | Non-porous, melted |
| 3 | 2 | a | +200 Al$_2$O$_3$ | 1:3 | Porous, MCG, tough |
| 3 | 3 | a | ZrO$_2$ | 1:3 | Non-porous, MG, tough |
| 3 | 4 | a | ZrSiO$_4$ | 1:3 | Porous, MCG, tough |
| 3 | 5 | a | −400 Al$_2$O$_3$ | 1:1 | V. rounded, glossy, FG |
| 3 | 6 | a | +200 Al$_2$O$_3$ | 1:1 | Porous, MCG |
| 3 | 7 | a | ZrO$_2$ | 1:1 | Glossy, non-porous, MFG, tough |
| 3 | 8 | a | ZrSiO$_4$ | 1:1 | Sl. porous, MCG, tough |
| 3 | 9 | b | −400 Al$_2$O$_3$ | 1:3 | Melted, clear |
| 3 | 10 | b | +200 Al$_2$O$_3$ | 1:3 | Melted, clear |
| 3 | 11 | b | ZrO$_2$ | 1:3 | Porous MG |
| 3 | 12 | b | ZrSiO$_4$ | 1:3 | Porous, semi-glossy, MCG |
| 3 | 13 | b | −400 Al$_2$O$_3$ | 1:1 | Glossy, puddled, FG |
| 3 | 14 | b | +200 Al$_2$O$_3$ | 1:1 | Slumped, non-porous, MFG |
| 3 | 15 | b | ZrO$_2$ | 1:1 | Non-porous, MFG, tough |
| 3 | 16 | b | ZrSiO$_4$ | 1:1 | Sl. slump, non-porous, MG, tough |
| 14 | 17 | a | −400 Al$_2$O$_3$ | 1:3 | Melted, non-porous |
| 14 | 18 | a | +200 Al$_2$O$_3$ | 1:3 | Rounded, MG, sl. porous |
| 14 | 19 | a | ZrO$_2$ | 1:3 | Rounded, MG, non-porous |
| 14 | 20 | a | ZrSiO$_4$ | 1:3 | Rounded, MG, porous |
| 14 | 21 | a | −400 Al$_2$O$_3$ | 1:1 | Rounded, MFG, non-porous |
| 14 | 22 | a | +200 Al$_2$O$_3$ | 1:1 | Non-porous, MG |
| 14 | 23 | a | ZrO$_2$ | 1:1 | Non-porous, MG, sl. slump |
| 14 | 24 | a | ZrSiO$_4$ | 1:1 | Rounded, MG, non-porous, glossy, tough |
| 14 | 25 | b | −400 Al$_2$O$_3$ | 1:3 | Clear, melted |
| 14 | 26 | b | +200 Al$_2$O$_3$ | 1:3 | Hazy, melted |
| 14 | 27 | b | ZrO$_2$ | 1:3 | Porous, MCG, semi-melted |
| 14 | 28 | b | ZrSiO$_4$ | 1:3 | Rounded, sl. porous, CG |
| 14 | 29 | b | −400 Al$_2$O$_3$ | 1:1 | Opaque, puddled |
| 14 | 30 | b | +200 Al$_2$O$_3$ | 1:1 | Slumped, non-porous, MG |
| 14 | 31 | b | ZrO$_2$ | 1:1 | Sl. rounded, porous, MG |
| 14 | 32 | b | ZrSiO$_4$ | 1:1 | V. rounded, FG, sl. porous |
| 17 | 33 | a | −400 Al$_2$O$_3$ | 1:3 | Glossy, FG, opaque, semi-melted, non-porous |
| 17 | 34 | a | +200 Al$_2$O$_3$ | 1:3 | Rounded, non-porous, FG |
| 17 | 35 | a | ZrO$_2$ | 1:3 | Rounded, non-porous, VFG |
| 17 | 36 | a | ZrSiO$_4$ | 1:3 | Rounded, non-porous, VFG |
| 17 | 37 | a | −400 Al$_2$O$_3$ | 1:1 | V. rounded, non-porous, FG |
| 17 | 38 | a | +200 Al$_2$O$_3$ | 1:1 | Porous, MG |
| 17 | 39 | a | ZrO$_2$ | 1:1 | Glossy, FG, non-porous |
| 17 | 40 | a | ZrSiO$_4$ | 1:1 | V. rounded, VFG, non-porous |
| 17 | 41 | b | −400 Al$_2$O$_3$ | 1:3 | Opal, melted |
| 17 | 42 | b | +200 Al$_2$O$_3$ | 1:3 | Opal, melted |
| 17 | 43 | b | ZrO$_2$ | 1:3 | Semi-melted, VFG, non-porous |
| 17 | 44 | b | ZrSiO$_4$ | 1:3 | Opal, melted |
| 17 | 45 | b | −400 Al$_2$O$_3$ | 1:1 | Rounded, FG, non-porous |
| 17 | 46 | b | +200 Al$_2$O$_3$ | 1:1 | Textured, sl. porous, MG |
| 17 | 47 | b | ZrO$_2$ | 1:1 | VFG, non-porous |
| 17 | 48 | b | ZrSiO$_4$ | 1:1 | Glossy, slumped, VFG, non-porous |

Composite pellets which combine good flow, sintering, and densification, as demonstrated by a rounded, non-porous pellet with a relatively fine-grained interior, are highly suitable for coating applications. Examples 19, 21, 24, 33, 40, and 48 from Table II are illustrative of materials exhibiting good coating potential.

Material devised for substrate applications must likewise display good sintering properties. Non-porous, relatively fine-grained, and preferably tough pellets, illustrated by Examples 3, 7, 15, and 16 in Table II, meet the requirements. Excellent wetting takes place between the glass and the ceramic, as is indicated by the reaction at 900° C. between ZrO$_2$ and the SiO$_2$ component of the glass to produce crystalline ZrSiO$_4$. For certain applications tough, yet porous, substrates, such as are exemplified by Examples 2, 4, and 8 in Table II, can be desirable.

The abbreviations listed in Table II have the following meanings:

Hrs = hours
MCG = medium coarse-grained
MG = medium-grained
V = very
FG = fine-grained
MFG = medium fine-grained
Sl = slight(ly)
CG = coarse-grained
VFG = very fine-grained

TABLE III

| COMP. | EX. | EXP | MOR | $K_{IC}$ | Phases Present |
|---|---|---|---|---|---|
| 3 | 1 | — | — | — | Minor $CaB_2O_4$, glass |
| 3 | 2 | 64.1 | 6,800 | 2.75 | $CaB_2O_4$, $Al_2O_3$, glass |
| 3 | 3 | 70.7 | 15,700 | 3.18 | $CaB_2O_4$, $ZrO_2$, *glass* |
| 3 | 4 | 56.5 | 9,450 | 2.36 | $ZrSiO_4$, $CaB_2O_4$, glass |
| 3 | 7 | — | — | — | $ZrO_2$, $CaB_2O_4$, glass |
| 3 | 8 | — | — | — | $ZrSiO_4$, $CaB_2O_4$, glass |
| 3 | 11 | — | — | — | $ZrSiO_4$, $CaB_2O_4$, $ZrO_2$, glass |
| 3 | 15 | — | — | — | $ZrSiO_4$, $ZrO_2$, $CaB_2O_4$, glass |
| 3 | 16 | — | — | — | $ZrSiO_4$, $CaB_2O_4$, glass |
| 14 | 24 | — | — | — | $ZrSiO_2$, $CaB_2O_4$, glass |
| 14 | 29 | — | — | — | $Al_2O_3$, minor $CaAl_2B_2O_7$, glass |
| 14 | 31 | — | — | — | $ZrSiO_4$, $ZrO_2$, minor $CaB_2O_4$, glass |
| 14 | 32 | — | — | — | $ZrSiO_4$, minor $CaB_2O_4$, glass |
| 17 | 35 | — | — | — | $ZrO_2$, glass |
| 17 | 37 | — | — | — | $Al_2O_3$, very minor $CaB_2O_4$, glass |
| 17 | 47 | — | — | — | $ZrSiO_4$, $ZrO_2$, glass |

In order to evaluate porous samples for potential use in bonded abrasives, small (3.5 grams) composite pellets were formed by mixing glass frit [particles passing a No. 325 U.S. Standard Sieve (44 μm)], ceramic particles passing a No. 80 U.S. Standard Sieve (177 μm), and small amounts of water at concentrations calculated to yield specific grain:bond proportions, as well as specific level of porosity (40% by volume) in the composite. The mixtures were blended by hand, after which cylindrical pellets were dry pressed at 10,000 psi (~703 kg/cm²) and fired according to selected heat treating schedules. For strength measurements, at least three pellets were prepared and tested at each condition and the measurements averaged.

After visual examination, the fired composite pellets were subjected to axial compression strength measurements, those values providing a measure of crushing strength. Where compositions and firing schedules yielded particularly high compression strengths, discs thereof having a diameter of 1.5" (~3.8 cm) and weighing 18 grams were prepared and fired in a manner similar similar to the pellets fired above. Those discs were submitted for modulus of rupture (MOR) testing utilizing a standard piston-on-three-ball technique.

Table IV reports the heat treatment schedules applied to the 3.5 gram composite pellets and the 18 gram discs employing an electrically heated furnace. After the final hold temperature, the pellets were cooled at furnace rate; i.e., the electric current to the furnace was cut off and the pellets were allowed to cool to room temperature retained within the furnace.

TABLE IV

Schedule A: Raise temperature to 900° C. at a rate of 100° C./hour; hold at 900° C. for 8 hours.
Schedule B: Raise temperature to 900° C. at a rate of 100° C./hour; hold at 900° C. for 4 hours, cool at furnace rate to 700° C.; hold at 700° C. for 4 hours.
Schedule C: Raise temperature to 800° C. at a rate of 100° C./hour; hold at 800° C. for 8 hours.
Schedule D: Raise temperature to 950° C. at a rate of 100° C./hour; hold at 950° C. for 8 hours.
Schedule E: Raise temperature to 1000 C at a rate of 100° C./hour; hold at 1000° C. for 4 hours; cool at furnace rate to 800° C.; hold at 800° C. for 4 hours.
Schedule F: Raise temperature to 825° C. at a rate of 100° C./hour; hold at 825° C. for 8 hours.
Schedule G: Raise temperature to 850° C. at a rate of 100° C./hour; hold at 850° C. for 8 hours.

Table V lists the heat treatment schedule applied to the composite pellets and discs, along with measurements of axial compression strength and modulus of rupture expressed in terms of kpsi and (kg/cm²), respectively.

TABLE V

| Composition | Heat Treatment | Compression Strength | Modulus of Rupture |
|---|---|---|---|
| 1 | Schedule A | 22 kpsi (~1547 kg/cm²) | — |
| 2 | Schedule A | 25 kpsi (~1758 kg/cm²) | — |
| 3 | Schedule A | 31 kpsi (~2180 kg/cm²) | 11 kpsi (~774 kg/cm²) |
| 3 | Schedule B | 36.3 kpsi (~2553 kg/cm²) | 11.5 kpsi (~809 kg/cm²) |
| 4 | Schedule B | 32 kpsi (~2250 kg/cm²) | — |
| 4 | Schedule C | 34 kpsi (~2391 kg/cm²) | 11 kpsi (~774 kg/cm²) |
| 4 | Schedule D | 29.2 kpsi (~2053 kg/cm²) | 11.4 kpsi (~802 kg/cm²) |
| 5 | Schedule A | — | — |
| 6 | Schedule A | 30 kpsi (~2110 kg/cm²) | 11.6 kpsi (~816 kg/cm²) |
| 7 | Schedule A | 30 kpsi (~2110 kg/cm²) | 10.4 kpsi (~731 kg/cm²) |
| 8 | Schedule A | 31 kpsi (~2180 kg/cm²) | 9.1 kpsi (~640 kg/cm²) |
| 9 | Schedule A | 31 kpsi (~2180 kg/cm²) | 11 kpsi (~774 kg/cm²) |
| 10 | Schedule A | 35 kpsi (~2461 kg/cm²) | — |
| 10 | Schedule E | 26.7 kpsi (~1878 kg/cm²) | 9.6 kpsi (~675 kg/cm²) |
| 11 | Schedule A | 29 kpsi (~2039 kg/cm²) | — |
| 12 | Schedule A | 29 kpsi (~2039 kg/cm²) | — |
| 13 | Schedule A | 34 kpsi (~2391 kg/cm²) | 10 kpsi (~703 kg/cm²) |
| 14 | Schedule A | 30 kpsi (~2110 kg/cm²) | 10.5 kpsi (~738 kg/cm²) |
| 14 | Schedule C | 38 kpsi (~2672 kg/cm²) | — |
| 15 | Schedule A | 29 kpsi (~2039 kg/cm²) | — |
| 16 | Schedule A | 36 kpsi (~2532 kg/cm²) | — |
| 17 | Schedule A | 40 kpsi (~2873 kg/cm²) | 10.2 kpsi (~717 kg/cm²) |
| 18 | Schedule F | 40 kpsi (~2873 kg/cm²) | — |
| 19 | Schedule C | 38 kpsi (~2672 KG/CM²) | 11.2 KPSI (~788 KG/CM²) |
| 20 | Schedule F | 41 kpsi (~2945 kg/cm²) | — |
| 21 | Schedule G | 41 kpsi (~2945 kg/cm²) | — |
| 22 | Schedule G | 42 kpsi (~3016 kg/cm²) | — |
| 23 | Schedule G | 40 kpsi (~2873 kg/cm²) | — |

Whereas the above laboratory activity was directed to fabricating bulk bodies, it will be appreciated that the inventive composites can be applied as coatings onto high temperature refractory ceramics and metals. Based upon an overall matrix of physical properties, the glass bonded $Al_2O_3$ composite comprising Composition 3, Schedule A, fired at 900° C. for 8 hours is considered to constitute the most preferred embodiment of the subject invention.

We claim:

1. Sintered glass bonded ceramic composite bodies consisting essentially of hard refractory ceramic particulates bonded together by a glass, said glass consisting essentially, expressed in terms of weight percent on the oxide basis, of 15–35% CaO, 35–55% $B_2O_3$, and 10–35% $SiO_2$, the sum of $CO + B_2O_3 + SiO_2$ constituting at least 80% of the total composition with the molar ratio $CaO:B_2O_3$ being less than 1, and up to 20% total of optional components in the indicated proportions selected from the group consisting of

| | | | | | |
|---|---|---|---|---|---|
| MgO | 0–15 | $Na_2O$ | 0–20 | $ZrO_2$ | 0–10 |
| SrO | 0–20 | $K_2O$ | 0–20 | $WO_3$ | 0–10 |
| BaO | 0–20 | $Al_2O_3$ | 0–20 | $MoO_3$ | 0–10 |
| $Li_2O$ | 0–15 | F | 0–8 | $Nb_2O_5$ | 0–20 |
| | | | | $P_2O_5$ | 0–20 |

2. Composite bodies according to claim 1 wherein said hard refractory ceramic particulates are selected from the group consisting of $Al_2O_3$, cordierite, SiC, $Si_3N_4$, $TiB_2$, TiN, zircon, and $ZrO_2$.

3. Composite bodies according to claim 1 wherein said glass consists essentially of 15–30% CaO, 40–52% $B_2O_3$, and 10–30% $SiO_2$ with the molar ratio $CaO:B_2O_3$ being 0.5–0.9.

4. Composite bodies according to claim 1 wherein said hard refractory ceramic particulates consist of abrasive particles and said bodies contain 0–70% by volume open porosity.

5. Composite bodies according to claim 4 wherein said abrasive particles consist essentially of alumina.

6. Composite bodies according to claim 4 consisting essentially, in volume percent, of 5–25% glass, 40–70% abrasive particles, and 25–50% open porosity.

7. Composite bodies according to claim 6 wherein said abrasive particles consist essentially of alumina.

* * * * *